(12) United States Patent
Dischinger et al.

(10) Patent No.: US 9,683,489 B2
(45) Date of Patent: Jun. 20, 2017

(54) SYSTEM AND METHOD FOR PREVENTING ICE CRYSTAL ACCRETION IN GAS TURBINE ENGINES

(71) Applicant: HONEYWELL INTERNATIONAL INC., Morristown, NJ (US)

(72) Inventors: Dave Dischinger, Tempe, AZ (US); Ronald Goodwin, Mesa, AZ (US); Harry Lester Kington, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 785 days.

(21) Appl. No.: 14/014,560

(22) Filed: Aug. 30, 2013

(65) Prior Publication Data

US 2015/0040577 A1    Feb. 12, 2015

Related U.S. Application Data

(60) Provisional application No. 61/864,309, filed on Aug. 9, 2013.

(51) Int. Cl.
*F02C 7/00* (2006.01)
*F02C 7/047* (2006.01)

(52) U.S. Cl.
CPC ............. *F02C 7/00* (2013.01); *F02C 7/047* (2013.01); *F05D 2260/231* (2013.01); *F05D 2270/311* (2013.01); *F05D 2270/312* (2013.01); *F05D 2270/313* (2013.01); *Y02T 50/675* (2013.01)

(58) Field of Classification Search
CPC ...... F02C 7/00; F02C 7/047; F05D 2270/311; F05D 2270/312; F05D 2270/313; F05D 2260/231; Y02T 50/675
See application file for complete search history.

(56) References Cited

U.S. PATENT DOCUMENTS

| 3,834,157 A | 9/1974 | Hoffmann |
| 4,783,026 A | 11/1988 | Rumford et al. |
| 4,831,819 A | 5/1989 | Norris et al. |
| 5,088,280 A * | 2/1992 | Scott-Scott ............ F02C 7/047 60/257 |

(Continued)

FOREIGN PATENT DOCUMENTS

| EP | 1405986 A2 | 4/2004 |
| GB | 621464 A | 4/1949 |

(Continued)

OTHER PUBLICATIONS

EP Extended Search Report for Application No. 14179020.4 dated Dec. 18, 2014.

(Continued)

*Primary Examiner* — Carlos A Rivera
(74) *Attorney, Agent, or Firm* — Lorenz & Kopf, LLP

(57) ABSTRACT

A system and method of operating an engine anti-ice system includes supplying heat from one or more heat sources to one or more components on or within a gas turbine engine, sensing data representative of one or more parameters related to ice crystal accretion, and based on the data, at least selectively inhibiting at least selected ones of the one or more heat sources from supplying heat to at least selected ones of the one or more components on or within the gas turbine engine.

13 Claims, 3 Drawing Sheets

(56) References Cited

U.S. PATENT DOCUMENTS

| | | | | |
|---|---|---|---|---|
| 5,216,477 | A | * | 6/1993 | Korb .................... G01P 5/26 356/28.5 |
| 5,488,375 | A | * | 1/1996 | Michie ................ G01S 13/953 342/26 B |
| 8,265,805 | B2 | | 9/2012 | Ma et al. |
| 8,452,516 | B1 | | 5/2013 | Rose et al. |
| 2004/0206854 | A1 | | 10/2004 | Shah et al. |
| 2008/0218385 | A1 | * | 9/2008 | Cook .................... B64D 15/20 340/962 |
| 2010/0065541 | A1 | | 3/2010 | Henze |
| 2011/0079015 | A1 | * | 4/2011 | Geis ..................... F01D 17/02 60/779 |
| 2012/0182544 | A1 | * | 7/2012 | Asahara ................ G01S 17/95 356/73 |
| 2013/0008174 | A1 | | 1/2013 | Gould et al. |
| 2013/0019608 | A1 | * | 1/2013 | Jones .................... F02C 7/275 60/779 |
| 2013/0032671 | A1 | | 2/2013 | Giles et al. |

FOREIGN PATENT DOCUMENTS

| | | |
|---|---|---|
| GB | 1547985 A | 7/1979 |
| GB | 2241536 A | 9/1991 |
| WO | 2009060446 A2 | 5/2009 |

OTHER PUBLICATIONS

Rios, M.A. et al.; Analysis of Ice Crystal Ingestion as a Source of Ice Accretion Inside Turbofans; 38th Fluid Dynamics Conference and Exhibit, Jun. 23-26, 2008, Seattle, WA; [Retrieved from Internet Jul. 24, 2013] [http://arc.aiaa.org/doi/abs/10.2514/6.2008-4165].

Carter, T.J.; Common Failures in Gas Turbine Blades; Engineering Failure Analysis; Science Direct, Engineering Failure Analysis 12 (2005) 237-247; Received Jun. 30, 2004; accepted Jul. 1, 2004, Available online Nov. 30, 2004. [www.elsevier.com/locate/engfailanal].

Dezitter, F. et al.; HAIC—High Altitude Ice Crystals; 5th AIAA Atmospheric and Space Environments Conference, Jun. 24-27, 2013, [Retrieved from Internet Jul. 24, 2013] [http://arc.aiaa.org/doi/abs/10.2514/6.2013-2674].

Shires, G.L. et al.; The Icing of Compressor Blades and their Protection by Surface Heating; Ministry of Supply, Aeronautical Research Council Reports and Memoranda, London: Her Majesty's Stationery Office 1958, Library Royal Aircraft Establishment, Bedford, R.&M. No. 3041 (18,246) A.R.C. Technical Report.

* cited by examiner

SYSTEM AND METHOD FOR PREVENTING ICE CRYSTAL ACCRETION IN GAS TURBINE ENGINES

CROSS-REFERENCE TO RELATED APPLICATIONS

This application claims the benefit of the benefit of U.S. Provisional Application No. 61/864,309, filed Aug. 9, 2013.

TECHNICAL FIELD

The present invention generally relates to gas turbine engines, and more particularly relates to systems and methods for preventing ice crystal accretion in gas turbine engines.

BACKGROUND

A gas turbine engine is used to power various types of vehicles and systems. A particular type of gas turbine engine that may be used to power aircraft is a turbofan gas turbine engine. A turbofan gas turbine engine typically includes five major sections: a fan section, a compressor section, a combustor section, a turbine section and an exhaust section. The fan section is positioned at the inlet section of the engine and includes a fan that induces air from the surrounding environment into the engine and accelerates a fraction of this air toward the compressor section. The compressor section raises the pressure of the air it receives from the fan section and directs a majority of the high pressure air into the combustor section. In the combustor section, the high pressure air is mixed with fuel and combusted. The high-temperature combusted air is then directed into the turbine section where it expands through and rotates each turbine to drive various components within the engine or aircraft. The air is then exhausted through a propulsion nozzle disposed in the exhaust section.

An aircraft turbofan gas turbine engine, such as the one described above, may be exposed to numerous and varied environmental conditions. For example, the engine may be exposed to various environmental conditions that may result in ice accretion at various locations on or within the engine. Not surprisingly, such accretion can adversely affect engine performance and/or have various other deleterious effects on engine components. Thus, many aircraft include anti-ice systems to prevent ice accretion on various locations on or within the engine.

Some governmental agencies, such as the Federal Aviation Administration (FAA), require many aircraft anti-ice systems be designed to prevent ice accretion, and more specifically supercooled droplet icing, on or within the engine up to a predefined certification altitudes and temperatures (e.g., 30,000 feet, −40 degrees Centigrade). Unfortunately, it has been discovered that these anti-ice systems are ineffective, and may even contribute to ice accretion through the addition of water droplets from melting ice crystals, at least during certain atmospheric conditions, at preventing ice crystal accretion at altitudes and temperatures above the predefined certification altitudes and temperatures.

Hence, there is a need for an aircraft anti-ice system that will prevent ice crystal accretion on various locations one or within an engine even at altitudes and temperatures above the predefined certification altitudes and temperatures. The present invention addresses at least this need.

BRIEF SUMMARY

In one embodiment, an engine anti-ice system includes one or more heat sources, one or more sensor data sources, and a controller. The one or more heat sources are configured to selectively heat one or more components on or within a gas turbine engine. The one or more sensor data sources are configured to supply data representative of one or more parameters related to ice crystal accretion. The controller is coupled to receive the data from the one or more sensors and is configured, in response to the data, to selectively at least inhibit at least selected ones of the one or more heat sources from supplying heat to at least selected ones of the one or more components on or within the gas turbine engine.

In another embodiment, an engine anti-ice system for an aircraft includes one or more heat sources, a temperature sensor, an altitude sensor, and a controller. The one or more heat sources are configured to selectively heat one or more components on or within a gas turbine engine. The temperature sensor is configured to sense ambient temperature outside of the aircraft and supply temperature data representative thereof. The altitude sensor is configured to sense aircraft altitude and supply altitude data representative thereof. The controller is coupled to receive the temperature data and the altitude data and is configured, in response to the temperature and altitude data, to selectively at least inhibit at least selected ones of the one or more heat sources from supplying heat to at least selected ones of the one or more components on or within the gas turbine engine.

In yet another embodiment, a method of operating an engine anti-ice system includes supplying heat from one or more heat sources to one or more components on or within a gas turbine engine, sensing data representative of one or more parameters related to ice crystal accretion, and based on the data, at least selectively inhibiting at least selected ones of the one or more heat sources from supplying heat to at least selected ones of the one or more components on or within the gas turbine engine.

Furthermore, other desirable features and characteristics of the engine anti-ice system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
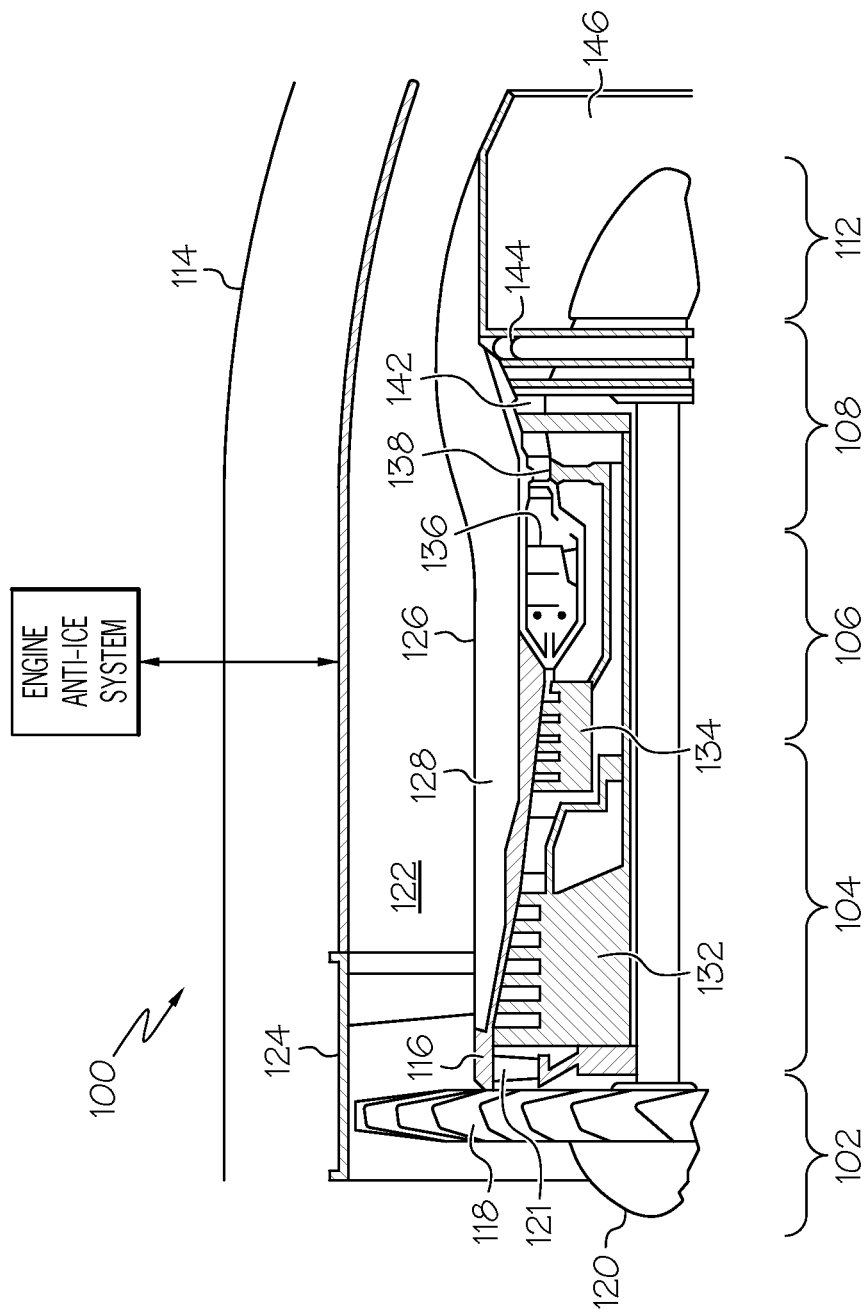
FIG. 1 depicts a partial, simplified cross-sectional view of one embodiment of a turbofan gas turbine engine and associated anti-ice system.

Referring now to FIG. 1, a simplified cross section view of a turbofan gas turbine propulsion engine 100 is depicted. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A spinner 120 is coupled to, and thus rotates with, the fan 118. The spinner 120 is configured to facilitate the correct flow of air into the fan 118. A fraction of the accelerated fan air that is exhausted from the fan 118 is directed through a fan air bypass duct 122 that is defined by an outer fan duct 124 that is spaced apart from and surrounds an inner fan duct 126. Most of the fan air that flows through the fan air bypass duct 122 is discharged from the bypass duct 122 to generate a forward thrust. The fraction of fan air that does not flow into the fan air bypass duct 122 is directed into the compressor section 104.

The compressor section 104 can include one or more compressors. The engine 100 depicted in FIG. 1 includes two compressors—an intermediate pressure compressor 132 and a high pressure compressor 134. No matter the number of compressors it includes, the air that is directed into the compressor section 104 is pressurized to a relatively high pressure. The relatively high pressure air is then directed into the combustion section 106, which includes a combustor 136 to receive not only the relatively high pressure air, but atomized fuel. The relatively high pressure air and atomized fuel are mixed within the combustor 136 and the mixture is ignited to generate combusted air. The combusted air is then directed into the turbine section 108.

The depicted turbine section 108 includes three turbines—a high pressure turbine 138, an intermediate pressure turbine 142, and a low pressure turbine 144—though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide additional forward thrust. As the turbines 138, 142, 144 rotate, each drives equipment in the gas turbine engine 100 via concentrically disposed shafts or spools as best seen in FIG. 1.

Figure 2:
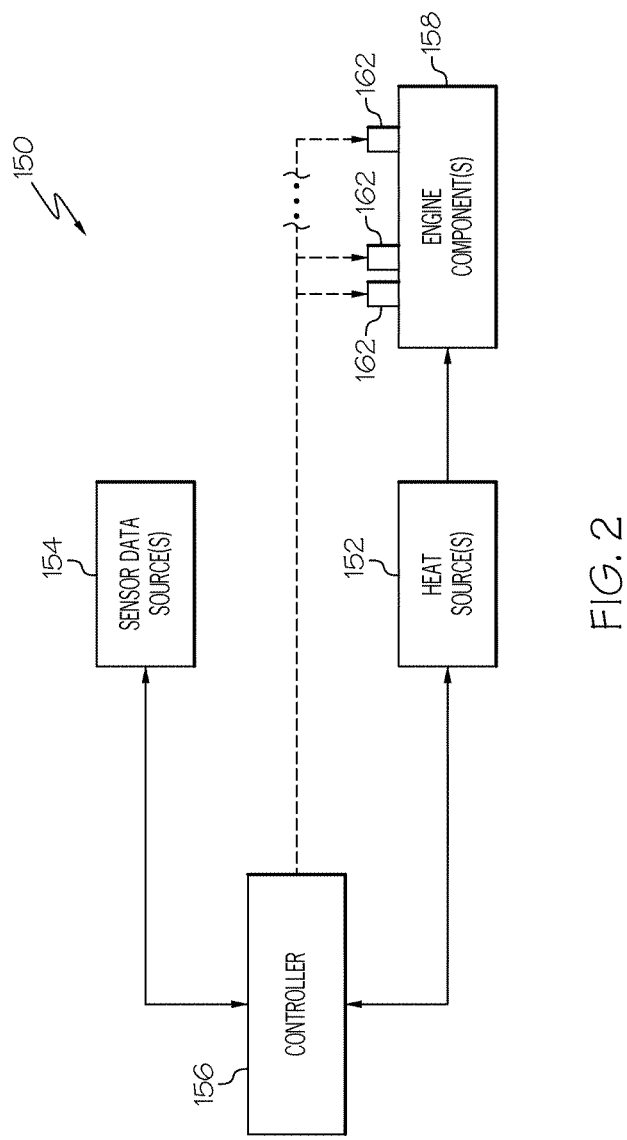
FIG. 2 depicts a functional block diagram of the anti-ice system depicted in FIG. 1.

The engine 100 may be exposed to various environmental conditions that may result in ice crystal accretion at various locations on or within the engine 100. Thus, when the engine 100 is installed on an aircraft, it is interfaced with an engine anti-ice system 150, an embodiment of which is depicted in more detail in FIG. 2. The engine anti-ice system 150 may be variously configured and implemented, but in the depicted embodiment it includes one or more heat sources 152, one or more sensor data sources 154, and a controller 156. For convenience of illustration, the one or more heat sources 152 and the one sensor data sources 154 are each depicted in FIG. 1 using a single functional block. It will be appreciated, however, that either or both of these functional blocks may represent single sources or multiple sources.

The one or more heat sources 152 are configured to selectively heat one or more engine components 158 that are disposed on or within the engine 100. The one or more heat sources 152 may be one or more pneumatic, hydraulic, electric, or ultrasonic heat sources, just to name a few. For example, the one or more heat sources 152 may be, but not limited to, relatively high-temperature bleed air from the engine 100 (or other source of relatively high-temperature air), and/or relatively high-temperature oil from, for example, a bearing sump, and/or electrical resistance heaters, and/or ultrasonic heaters.

The one or more engine components 158 that the one or more heat sources 152 selectively heat may also vary. In the depicted embodiment, the engine components 158 include the spinner 120, one or more inlet guide vanes 121, and may additionally include one or more additional components disposed downstream of the inlet guide vanes 121. These one or more additional components may include guide vanes and/or other structure associated with the intermediate pressure compressor 132 and/or the high pressure compressor 134. It will be appreciated, however, that the engine components 158 may additionally or instead include various other components disposed on or within the engine 100 that are upstream of or within the compressor section 104.

The one or more sensor data sources 154 are configured to supply data to the controller 156 that are representative of one or more parameters related to ice crystal accretion. The one or more parameters may vary and may include, for example, altitude and temperature and/or weather data and/or ice crystal presence. When the one or more parameters include altitude and temperature, the one or more sensors 154 may include, for example, one or more altitude pressure sensors and one or more temperature sensors. When the one or more parameters include weather data, the one or more sensors 154 may include, for example, a weather radar system. When the one or more parameters include ice crystal presence, the one or more data sources 154 may include, for example, a Coherent Rayleigh Lidar system.

Regardless of how the one or more data sources 154 are implemented, the controller 156 is coupled to receive the data supplied thereby. The controller 156 is additionally configured, in response to the data, to selectively prevent (or at least inhibit) the one or more heat sources 152 from supplying heat to at least selected ones of the one or more engine components 158. More specifically, the controller 156 is configured, in response to the data, to determine if one or more criteria are met and, if so, to prevent (or inhibit) at least selected ones of the one or more heat sources 152 from supplying heat to at least selected ones of the one or more components 158. It will be appreciated that the one or more criteria may vary. For example, in one embodiment the criterion is that the aircraft is at or above a predetermined altitude and/or temperature. In another embodiment, the criterion is that the weather conditions indicate a high likelihood that ice crystals are present in the air. In yet another embodiment, the criterion is that the presence of ice crystals has been detected. Before proceeding further, the reason for this functionality will now be described.

It was previously noted that most aircraft anti-ice systems 150 are designed to prevent supercooled droplet icing up to a predefined certification altitude and at a predefined certification temperature (e.g., 30,000 feet, −40 degrees Centigrade). Above these certification altitudes and temperatures supercooled droplets are typically not present. However, ice crystals may be present, and some turbofan gas turbine engines 100 are susceptible to ice crystal accretion. Ice crystal accretion in a turbofan gas turbine engine 100, and most typically in the compressor section 104 of an engine 100, can initiate when ice crystals hit a heated component 158. The ice crystals melt and send water droplets back into the compressor section 104. These water droplets may then combine with unmelted ice crystals and stick to compressor vanes. This can potentially result in several undesirable effects. For example, this can potentially cause flow blockage, ice shedding, surge, stall, or combustor flame out.

Returning now to the description, the controller 156 is additionally configured, upon determining that the one or more criteria are met, to supply appropriate commands to a controlled component 162 that is associated with a different one of the one or more engine components 158 to prevent (or inhibit) at least selected ones of the one or more heat sources 152 from supplying heat to at least selected ones of one or more engine components 158 on or within the engine 100. The type of commands that the controller 156 supplies may vary and may depend, for example, upon how the one or more controlled components 162 are implemented, which may in turn depend upon how the one or more heat sources 152 are implemented. For example, in one particular embodiment, relatively high-temperature lubricant is supplied to the spinner 120 and relatively high-temperature bleed air is supplied to the inlet guide vane(s) 121. In this particular embodiment, the one or more controlled components 162 include an insulative shield and a valve. The insulative shield is disposed adjacent the spinner 120, and the valve is disposed on an air supply conduit between the inlet guide vane(s) 121 and the relatively high-temperature bleed air source. The controller 156 is configured, in response to determining that one or more criteria are met, to supply commands that control the positions of these controlled components 162. Specifically, the controller 156 is configured to supply commands that will move the insulative shield between the spinner 121 and the relatively high-temperature lubricant source, and that will move the valve to a closed position to prevent bleed air from flowing to the inlet guide vane(s) 121. In other embodiments, the controller 156 may also (or instead) be configured to de-energize one or more electrical heaters and/or ultrasonic heaters.

Figure 3:
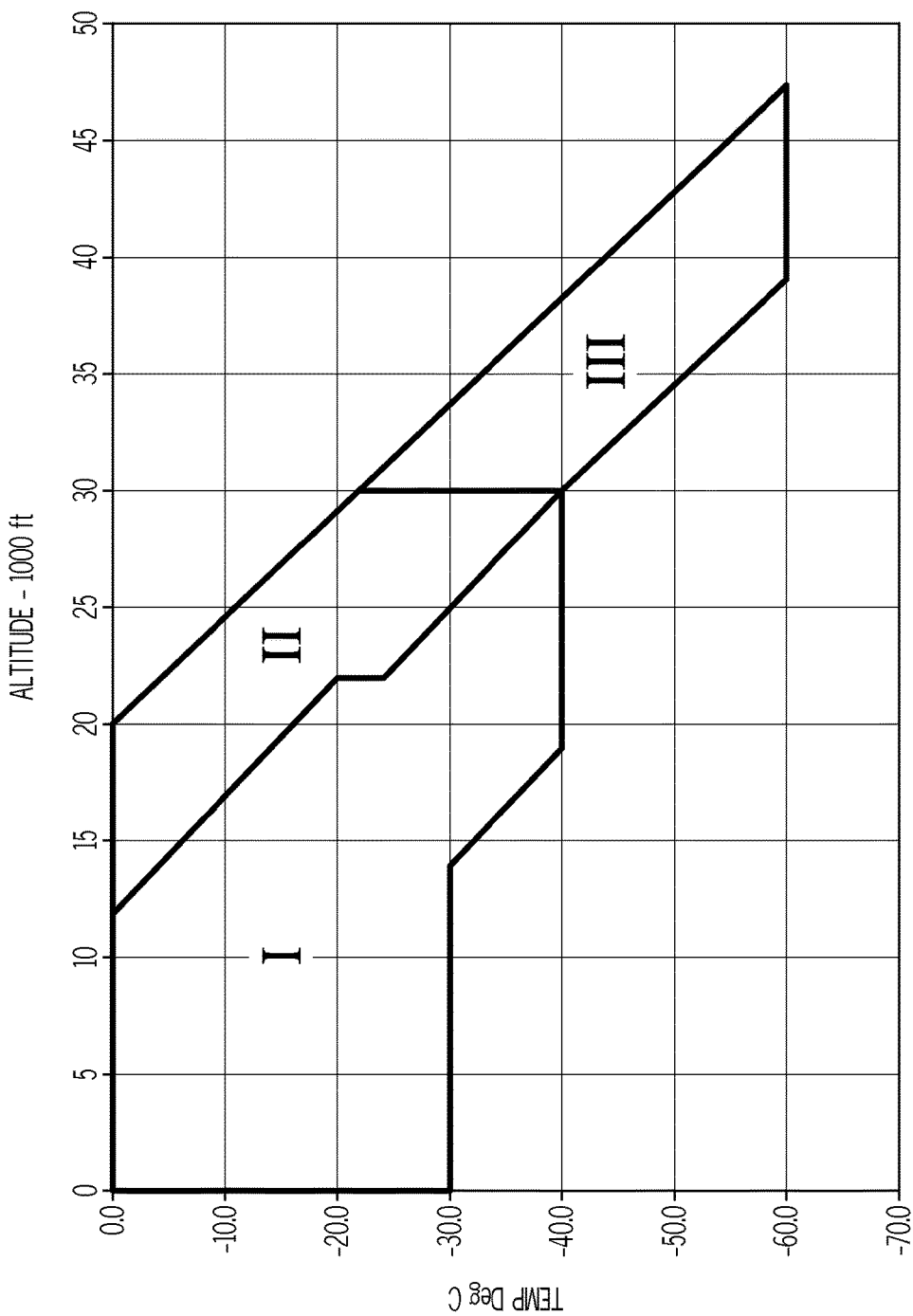
FIG. 3 depicts a graph of altitude and temperature regions of differing anti-icing requirements.

It should be noted that with some embodiments, the anti-ice system 150 is configured to selectively prevent (or at least inhibit) all of the heat sources 152 from supplying heat to all of the engine components 158 when one or more criteria are met. In other embodiments, the anti-ice system 150 is configured to selectively prevent (or at least inhibit) selected ones of the heat sources 152 from supplying heat to only selected ones of the engine components 158 when one or more criteria are met. For example, and with reference now to FIG. 3, in some embodiments the anti-ice system 150 is configured such that all of the heat sources 152 supply heat to all of the engine components 158 whenever the aircraft is operating at altitudes and temperatures in temperature-altitude region I, and to selectively prevent (or at least inhibit) heating of all of the engine components 158 whenever the aircraft is operating at altitudes and temperatures in temperature-altitude regions II and III. In other embodiments, however, the anti-ice system 150 is configured such that all of the heat sources 152 supply heat to all of the engine components 158 whenever the aircraft is operating at altitudes and temperatures in temperature-altitude region I, and to selectively prevent (or at least inhibit) heating of only selected ones of the engine components 158 whenever the aircraft is operating at altitudes and temperatures in temperature-altitude region II and at altitudes in temperature-altitude region III. It will be appreciated that the altitude-temperature regions depicted in FIG. 3 are merely exemplary, and that the anti-ice system 150 could be configured to selectively prevent (or at least inhibit) heating of selected ones of the engine components 158 in various other predefined altitude-temperature regions, if needed or desired.

The anti-ice system 150 described herein actively controls the heating of one or more engine components 158 to prevent, or at least mitigate, ice crystal accretion by shutting down the source of liquid water when ice crystal conditions exist or are likely to exist. Specifically, by preventing (or at least inhibiting) at least selected ones of the one or more heat sources 152 from supplying heat to at least selected ones of the one or more engine components 158, the temperatures of the one or more engine components 158 will decrease, becoming relatively cold. Thus, these one or more engine components 158 will not melt ice crystals. Instead, the ice crystals will be deflected and sent back into the engine 100 with no liquid water. The ice crystals will then be unable to stick to the areas that accrete ice when the one or more heats sources 152 supply heat.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine anti-ice system, comprising:
one or more heat sources configured to selectively heat one or more components on or within a gas turbine engine;
one or more sensor data sources configured to supply data representative of one or more parameters related to ice crystal accretion; and a controller coupled to receive the data from the one or more sensors and configured, in response to the data, to (i) determine if one or more criteria are met, and (ii) when the one or more criteria are met, at least inhibit at least selected ones of the one or more heat sources from supplying heat to at least selected ones of the one or more components on or within the gas turbine engine, wherein the one or more criteria comprise ice crystal presence in the air has been detected.

2. The system of claim 1, wherein the one or more criteria further comprise:

ambient temperature outside the aircraft is less than or equal to a predetermined temperature; and aircraft altitude is at or above a predetermined altitude.

3. The system of claim 1, wherein the one or more criteria further comprise aircraft altitude is at or above a predetermined altitude.

4. The system of claim 1, wherein the one or more heat sources comprise engine bleed air.

5. The system of claim 1, wherein the one or more heat sources comprise a lubricant.

6. The system of claim 1, wherein the one or more heat sources comprise one or more electrical heaters.

7. The system of claim 1, wherein the one or more heat sources comprise one or more ultrasonic heaters.

8. The system of claim 1, wherein the one or more components comprise a spinner.

9. The system of claim 1, wherein the one or more components comprise one or more guide vanes.

10. The system of claim 1, wherein the one or more sensor data sources comprise:

one or more altitude sensors; and one or more temperature sensors.

11. The system of claim 1, wherein the one or more sensor data sources comprise a weather radar system.

12. The system of claim 1, wherein the one or more sensor data sources comprise a Coherent Rayleigh Lidar System.

13. A method of operating an engine anti-ice system, comprising the steps of:

supplying heat from one or more heat sources to one or more components on or within a gas turbine engine;

sensing data representative of one or more parameters related to ice crystal accretion;

processing the data to determine when there is ice crystal presence in the air; and when there is ice crystal presence in the air, inhibiting at least selected ones of the one or more heat sources from supplying heat to at least selected ones of the one or more components on or within the gas turbine engine.

* * * * *